United States Patent Office 3,095,406
Patented June 25, 1963

3,095,406
PREPARATION OF POLYMERS OF
CONJUGATED DIENES
James N. Short and James E. Puckett, Bartlesville, Okla., assignors to Phillips Petroleum Company, a corporation of Delaware
No Drawing. Filed July 28, 1958, Ser. No. 751,187
15 Claims. (Cl. 260—94.3)

This invention relates to the preparation of polymers of conjugated dienes. In one aspect, the invention relates to a method for polymerizing conjugated dienes in the presence of a catalyst comprising an organometal or metal hydride. In another aspect, the invention relates to a polymerization process in which the conjugated diene to be polymerized is pretreated prior to contact with the polymerization catalyst.

It has been previously disclosed that conjugated dienes can be polymerized in the presence of a catalyst comprising an organometal or a metal hydride. However, it has been found that when the polymerization is carried out at low catalyst levels, for example, in the case of butyllithium at below 4 millimols per 100 grams of monomer charged to the process, rather erratic results are often obtained. In other words, the polymerization reaction may or may not occur. In many cases where polymerization does take place, the product has a low inherent viscosity (low molecular weight), and a polymer is often obtained which is soft and sticky or it may in some instances resemble a wax instead of a rubber. Although the conjugated dienes are ordinarily used in a high state of purity, it appears that they still contain small amounts of materials which have a deleterious effect on the polymerization catalyst and which are believed to be in some way responsible for the erratic results obtained. Treatment of conjugated dienes, such as butadiene or isoprene, with a drying agent, e.g., calcium sulfate, prior to polymerization has been tried in order to remove traces of moisture which might account for the unsatisfactory results. However, even when following this procedure, polymerization may not occur with any regularity unless comparatively large amounts of catalyst are utilized. Furthermore, in instances where polymerization does occur, the conversion is frequently low and the polymer product may have a low inherent viscosity. While the use of higher catalyst levels might appear to be feasible, increasing the amount of the catalyst often results in the production of polymers with decreasing inherent viscosity, and low molecular weight, sticky and non-rubbery products are often obtained.

It is an object of this invention, therefore, to provide an improved process for polymerizing conjugated dienes in the presence of a catalyst comprising an organometal or a metal hydride.

Another object of the invention is to provide a process for polymerizing conjugated dienes in which the polymerization is carried out at catalyst levels lower than those usually employed while obtaining a product having good physical properties.

A further object of the invention is to provide a process for polymerizing conjugated dienes in which the conjugated dienes are pretreated prior to contact with the polymerization catalyst so as to thereby obtain rubbery polymer products having desirable physical properties.

Other and further objects and advantages of the invention will become apparent to those skilled in the art upon consideration of the accompanying disclosure.

The instant invention is concerned with a process whereby conjugated dienes can be consistently polymerized to rubbery polymers of a desired inherent viscosity. Broadly speaking, in a process in which a conjugated diene is contacted with a polymerization catalyst, the instant invention resides in the improvement which comprises treating the conjugated diene with a polyhydric alcohol prior to its being contacted with the catalyst. It has been discovered that the polymerization can be effected at relatively low catalyst levels to give firm, non-sticky, rubbery polymers if the conjugated diene is first treated with a polyhydric alcohol. The polyhydric alcohol treatment can be effected by any suitable method known in the art, for example, by liquid-liquid extraction with subsequent separation of the monomer phase or by vapor-liquid extraction in a column.

The monomeric material polymerized to produce rubbery polymers by the process of this invention comprises conjugated dienes containing from 4 to 10, inclusive, carbon atoms. Examples of conjugated dienes which can be used include 1,3-butadiene, 2-methyl-1,3-butadiene (isoprene), 2,3-dimethyl-1,3-butadiene, 1,3-pentadiene, 2-methyl-1,3-pentadiene, 2,3-dimethyl-1,3-pentadiene, 3-methyl-1,3-pentadiene, 2-phenylbutadiene, and the like.

This invention is applicable to the polymerization of the above-defined conjugated dienes either alone or in admixture with each other and/or with one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes such as butene-2, pentene-2, hexene-2, heptene-2, 2-methylbutene-1, 2-methylhexene-1, 2-ethylheptene-1, and the like. Other olefins which can be used include di- and polyolefins, such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonitrile, methyl acrylate, methyl methacrylate, vinyl acetate, vinyl chloride, vinylidene bromide, 2-methyl-5-vinylpyridine, 2-vinylpyridine, 3-vinylpyridine, 3-vinyltoluene, 1-vinylnaphthalene, 2-vinylnaphthalene, 4-vinyltoluene.

As previously mentioned prior to contact with the polymerization catalyst, the conjugated dienes to be polymerized are treated with a polyhydric alcohol. The polyhydric alcohol is liquid under the treating conditions and preferably contains not more than 10, more desirably not more than 5, carbon atoms per molecule. The term "polyhydric alcohol" as used herein is intended to designate an alcohol containing two or three hydroxy groups. As the treating agent, it is preferred to use the glycols, particularly ethylene glycol. Examples of polyhydric alcohols which can be employed include glycols, such as ethylene glycol, propylene glycol, diethylene glycol, trimethylene glycol, triethylene glycol, tetramethylene glycol, diethylene glycol, triethylene glycol, butylene glycol, amylene glycol, 1,6-hexamethylene glycol (1,6-hexanediol), 2,4-hexanediol, 1,8-octanediol, 4,5-octanediol, 1,10-decanediol, and 1,2-decanediol, glycerol, 1,2,3-butanetriol, 1,3,5-pentanetriol, and 2,3,4-hexanetriol. With the lower viscosity treating agents, such as ethylene glycol, the treatment can be effected at room temperature, e.g., at about 25° C. However, with materials which are very viscous or solid at room temperature, such as glycerol or 1,8-octanediol, higher temperatures, e.g., up to about 80° C., are advantageously utilized in order to facilitate contact of the conjugated diene with the treating agent in liquid form.

After treatment of the conjugated dienes with the polyhydric alcohol treating agent, the polymerization is effected by contacting the conjugated dienes with the polymerization catalyst. Because of this treatment of the monomeric materials, it has been found that the polymerization can be carried out at much lower catalyst levels than those ordinarily employed. Thus, it has been found that polymerization can be effected using catalyst levels as low as 1.5 millimoles per 100 grams of monomers. On the other hand, when untreated monomers are used, about 3 millimoles are required. Furthermore, when operating at a catalyst level of 1.5 to 3 millimoles, high conversions are consistently obtained while producing rubbery polymers having desirable physical characteristics. The reason for such improvement in the polymerization is not completely understood. However, it appears that the treatment with the polyhydric alcohols results in the removal of materials which when present adversely affect the polymerization catalyst. Since treatment with a conventional drying agent does not result in the unexpected improvement, it appears that the polyhydric alcohol treatment of the conjugated dienes has an effect other than the mere removal of moisture from the monomeric materials.

The catalysts used in the practice of the process of this invention are, in general, those which are effective for polymerizing conjugated dienes to solid polymers. It is usually preferred to employ a catalyst comprising a member selected from the group consisting of organometals and metal hydrides. The organometals and the metal hydrides are often used in admixture with certain metal compounds as will become apparent hereinafter from the description of catalyst systems containing two components.

One particularly effective catalyst for use in the process of this invention comprises an organolithium compound corresponding to the general formula R(Li)$_x$, wherein R is a hydrocarbon radical selected from the group consisting of aliphatic, cycloaliphatic and aromatic radicals and combinations of these radicals and $x$ is an integer from 1 to 4, inclusive. The R group has a valence equal to the integer $x$ and preferably contains from 1 to 20, inclusive, carbon atoms, although it is within the scope of the invention to use higher molecular weight compounds. Examples of organolithium compounds which can be used include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithiobutene-2, 1,8-dilithio-3-decene, 1,4-dilithiobenzene, 1,5-dilithionaphthalene, 1,2-dilithio-1,2-diphenylethane, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, and the like.

When employing a two component catalyst system to polymerize conjugated dienes according to this invention, one component is an organometal or a metal hydride and the second component is a Group IV to VI and VIII (Mendeleef's Periodic System) metal compound, e.g., a salt or alcoholate. The organometal compounds referred to include, without limitation, alkyl, cycloalkyl, aryl, alkaryl, aralkyl, alkylcycloaryl, or cycloalkylaryl compounds of di-, tri-, or tetravalent metals, particularly Group I, II, III or IVB metals such as sodium, potassium, lithium, rubidium, cesium, magnesium, cadmium, mercury, zinc, barium, lead, tin, aluminum, boron, gallium, indium and beryllium, or such organometal compounds in which one or more of the organo groups is replaced by a hydrogen atom and/or a halogen atom. The organo groups can be quite large, compounds being applicable which have 15 or more carbon atoms in each group and 40 or more carbon atoms in the molecule. Specific examples of such organometal compounds include triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride or diethylaluminum chloride, taken alone, trioctylaluminum, tridodecylaluminum, triphenylaluminum, triphenylgallium, diphenylberyllium, dicyclohexylberyllium, diethylzinc, cyclohexylzinc chloride, tetraphenyllead, tetraethyltin, and CH$_3$AlCl$_2$, (C$_4$H$_9$)$_2$AlBr, C$_9$H$_{17}$AlI$_2$, (C$_3$H$_7$)$_2$GaF (C$_6$H$_{11}$)$_2$GaCl (cyclohexane derivative), C$_6$H$_5$GaBr$_2$, C$_{20}$H$_{41}$GaBr$_2$, (C$_{14}$H$_{29}$)$_2$GaF, (C$_6$H$_5$)$_2$InCl, C$_8$H$_{17}$InF$_2$, C$_6$H$_{11}$InBr$_2$ (cyclohexane derivative), C$_{17}$H$_{35}$BeI, and the like.

The metal hydrides which can be employed include hydrides of Groups I, II and III metals. Specific examples of suitable hydrides are aluminum hydride, lithium aluminum hydride, barium hydride, gallium hydride, indium hydride, sodium aluminum hydride, and potassium beryllium hydride, and the like.

The compounds of a metal of Groups IV to VI and VIII of the Periodic System include the oxides, hydrides, halides, oxyhalides, and salts of organic acids, usually having 20 or less carbon atoms, such as formic acid. Examples of these metals are titanium, zirconium, thorium, hafnium, vanadium, chromium, molybdenum and iridium.

The alcoholates of a metal of Group IV of the Periodic System which can be employed with an organometal or metal hydride conform to the formula X$_n$M(OR)$_m$, where $m+n$ equals the valence of the metal M, X is a halogen, and R is an organic radical, usually having 20 or less carbon atoms and preferably being an alkyl, cycloalkyl or aryl group. Specific examples of such alcoholates are titanium butoxide (tetra-n-butyl titanate), tetra-sec-butyl titanate, tetraisopropyl titanate, tetra-2-ethylbutyl titanate, tetrastearyl titanate, tetraethyl titanate, tetra(choroethyl)titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichlorodiethyl titanate (Cl$_2$Ti(OC$_2$H$_5$)$_2$), monochlorotriethyl titanate (ClTi(OC$_2$H$_5$)$_3$), and dichlorodiethyl zirconate (Cl$_2$Zr(OC$_2$H$_5$)$_2$)

Also included are such compounds as Hf(OCH$_3$)$_4$, Tl(OC$_3$H$_7$)$_4$, Th(OC$_6$H$_5$)$_4$, Cl$_3$Ti(OC$_6$H$_4$OH$_3$), Zr(OC$_4$H$_7$)$_4$, Cl$_2$Hf(OC$_{10}$H$_{21}$)$_2$, Th(OC$_6$H$_{13}$)$_4$, and Zr(OC$_{12}$H$_{25}$)$_4$.

A particularly useful catalyst system for employment in the process of this invention comprises (1) a compound corresponding to the formula M'R'$_x$, where M' is one of the metals aluminum, gallium, indium, thallium, beryllium, mercury, lead, zinc or mercury, R' is hydrogen, an alkyl, cycloalkyl, aryl, alkaryl, aralkyl, alkylcycloalkyl, or cycloalkylalkyl radical and $x$ is equal to the valence of the metal M, and (2) a halide of a Group IV, V or VI metal, such as titanium, vanadium or molybdenum. Examples of the M'R'$_x$ compounds have been given hereinbefore. The M'R'$_x$ compounds can also be used in the form of their known and stable organic complexes, such as complexes with ethers, thioethers, amines, alkali metal hydrides, alkali metal alkyls or alkali metal aryls. Examples of such complex compounds which can be employed include LiAlH$_4$, NaAl(CH$_3$)$_4$, NaBe(C$_6$H$_5$)$_3$, NaBe(C$_2$H$_5$)$_3$, and the like.

Examples of suitable catalyst systems in accordance with the foregoing disclosure are as follows:

(a) Aluminum trialkyls, e.g., triethylaluminum or triisobutylaluminum, and the tetravalent metal halides of the type represented by titanium tetrachloride or titanium tetraiodide;

(b) Molybdenum pentachloride and an organometal compound exemplified by diethylzinc or diisobutylmercury;

(c) A complex metal hydride, such as lithium aluminum hydride, and a Group IV metal halide, such as titanium tetraiodide or titanium tetrachloride;

(d) A complex metal halide, exemplified by potassium fluotitanate, and an organometal compound, exemplified by triethylaluminum;

(e) A derivative of a Group VIII metal selected from the group consisting of halides, oxides and complex compounds of iridium, platinum and osmium, said complex compounds corresponding to the formula M"$_a$M'''X$_b$, where M" is an alkali metal or an ammonium radical, M''' is irridium, platinum or osmium, X is a halogen, and $b$ is at least 1 and the sum of $a$ and $b$ is equal to the valence of M''' and an organometal compound exemplified by triethylaluminum, for example, iridium chloride and triethylaluminum or ethylaluminum sesquichloride;

(f) At least one derivative selected from the group consisting of oxides, halides, and oxyhalides of vanadium and complex salts of said halides with a member selected from the group consisting of ammonium halide and an alkali metal halide and an organometal compound, for example, vanadium oxide and triethylaluminum;

(g) A derivative of a Group VI metal selected from the group consisting of halides, oxyhalides, hydroxyhalides, oxyhydroxyhalides of a metal selected from the group consisting of molybdenum, tungsten, uranium, selenium, tellurium and polonium, and complex salts of said halides and said oxyhalides with a member selected from the group consisting of halides of sodium, potassium, lithium, rubidium, cesium and ammonia and an organometal compound, for example, molybdenum pentachloride and ethylaluminum dichloride;

(h) A chromyl halide and an organometal compound, such as chromyl chloride and triisobutylaluminum; and (i) At least one halide of titanium, zirconium or hafnium and at least one hydride of lithium, sodium, potassium, rubidium, cesium, magnesium, calcium, strontium, barium, lanthanium or thorium, for example, zirconium tetrachloride and calcium hydride.

The polymerization process of this invention is usually carried out in the presence of a hydrocarbon diluent which is liquid and inert under the conditions of the process. Examples of suitable diluents include aromatic, paraffinic and cycloparaffinic hydrocarbons, it being understood that mixtures of these materials can also be used. Specific examples of suitable hydrocarbon diluents include propane, isobutane, n-pentane, iso-octane, n-dodecane, cyclopentane, cyclohexane, methylcyclohexane, benzene, toluene, xylene, and the like. It is also within the scope of the invention to employ in admixture with the hydrocarbon diluent polar compounds which do not inactivate the organolithium catalyst. When employing an organolithium compound as the catalyst, it has been found that the use of polar compounds in admixture with the hydrocarbon diluent increases the reaction rate of the polymerization process of this invention. Examples of polar compounds which do not inactivate the organolithium catalyst and which may, therefore, be utilized with the hydrocarbon diluents are ethers, thioethers (sulfides), and tertiary amines. Specific examples of such polar materials include dimethyl ether, diethyl ether, ethyl methyl ether, ethyl propyl ether, di-n-propyl ether, di-n-octyl ether, tetramethylene oxide (tetrahydrofuran), dioxane, paraldehyde, anisole, 1,2-dimethoxyethane, dibenzyl ether, diphenyl ether, dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, N,N-dimethylamine, pyridine, quinoline, N-ethylpiperidine, N-methyl-N-ethyl aniline, N-methylmorpholine, and the like. It is to be understood also that mixtures of these polar compounds can be employed in the practice of the instant invention. When a polar compound is used in admixture with the hydrocarbon diluent, the polar compound is usually present in an amount in the range of 0.005 to 50 percent by weight of the total solvent mixture.

The polymerization process of this invention can be carried out at any temperature within the range of about −80 to 150° C., but it is preferred to operate in the range of −20 to 80° C. The polymerizatoin reaction can be carried out under autogenous pressures. It is usually desirable to operate at pressures sufficient to maintain the monomeric material substantially in the liquid phase. The pressure will thus depend upon the particular material being polymerized, the diluent being employed, and the temperature at which polymerization is conducted. However, higher pressures can be employed if desired, these pressures being obtained by some such suitable method as the pressurization of a reactor with a gas which is inert with respect to the polymerization reaction. The polymerization according to this invention is generally carried out in the liquid phase. However, depending upon the diluent and polymerization temperature selected, the polymerization can be conducted in the solid phase.

As previously indicated, the process of this invention is concerned with the production of rubbery polymers of conjugated dienes. The term "rubbery polymer" includes elastomeric, vulcanizable, polymeric material which after vulcanization, i.e., crosslinking, possesses the properties normally associated with vulcanized rubber including materials which when compounded and cured exhibit reversible extensibility at 80° F. of over 100 percent of a specimen's original length with a retraction of at least 90 percent within one minute after release of the stress necessary to elongate to 100 percent. The rubbery polymers produced in accordance with this invention are linear polymers. With regard to the solubility of the rubbery polymers of this invention, it is preferred that they contain less than 50% gel as determined by the standard gel determination test. Actually, it has been found that the polymers produced in accordance with the instant process generally contain no gel or substantially no gel.

The process of this invention can be carried out as a batch process by charging the monomeric material after treatment with the polyhydric alcohol treating agent into a reactor containing the polymerization catalyst and the hydrocarbon diluent. It is to be understood that it is not intended to limit the invention to a specific charging procedure since the catalyst diluent and monomer can be added in any desired order. The process can also be carried out continuously by maintaining the above-mentioned concentration of reactants in the reactor for a suitable residence time. The residence time in a continuous process will, of course, vary within rather wide limits depending on such variables as the reaction temperature and pressure, the amount of catalyst used, and the monomeric material which is being polymerized. In a continuous process, the residence time generally falls within the range of 1 second to 1 hour when conditions within the specified ranges are employed. When a batch process is being utilized, the time for the reaction can be as high as 24 hours or more, although it is generally less than 24 hours.

It is preferred that the diluent used in the process be substantially free of impurities such as water, oxygen and the like. In this connection, it is desirable to remove air and moisture from the reaction vessel in which the polymerization is carried out.

At the conclusion of the polymerization reaction, when a batch process is used, the total reaction mixture is then treated by any suitable method to inactivate the catalyst and recover the polymer. In one suitable method, a catalyst inactivating material, such as water or an alcohol, e.g. isopropyl alcohol, is added in amount which is sufficient to deactivate the catalyst without causing precipitation of the desired polymer. It has also been found to be advantageous to add an antioxidant, such as phenyl-beta-naphthylamine, to the polymer solution prior to precipitation of the polymer. After addition of the catalyst inactivating agent and the anti-oxidant, the polymer present in the solution can then be precipitated by the addition of an excess of a material such as water, ethyl alcohol or isopropyl alcohol. It is to be understood that deactivation of the catalyst and precipitation of the polymer can be accomplished in a single step. The precipitated polymer can then be recovered by filtration, decantation, or the like.

The rubbery polymers which result when a monomeric material comprising a conjugated diene is polymerized by the method of this invention can be compounded by any of the known methods such as have been used in the past for compounding natural rubber. Vulcanization accelerators, reenforcing agent, and fillers such as have been employed in natural rubber can likewise be used in the compounds of this invention.

A more comprehensive understanding of the invention can be obtained by referring to the following illustrated examples which are not intended, however, to be unduly limitative of the invention.

EXAMPLE I

Butadiene, treated in various ways with ethylene glycol and also without the glycol treatment, was polymerized in a series of runs using n-butyllithium as the catalyst.

The n-butyllithium catalyst was prepared and used in n-pentane solution. A 1000 milliliter three-necked flask, fitted with a reflux condenser, a dropping funnel with a gas outlet sidearm, and a high speed stirrer, was swept with prepurified nitrogen and charged with 300 milliliters of dry, olefin-free n-pentane and 5.9 grams of lithium wire which was cut into lengths of about 0.5 centimeter. The dropping funnel was then attached, and a solution of 38.9 grams of 1-chlorobutane in 100 milliliters of n-pentane was charged to it. The stirrer was started and brought to high speed, and the chlorobutane solution was added without cooling at a rate so as to maintain gentle reflux. After the addition was completed, stirring was continued for three hours. The mixture was allowed to stand overnight in a nitrogen atmosphere and was then transferred to a 7-ounce beverage bottle and centrifuged. The supernatant n-butyllithium solution was pressured into a dry, nitrogen-filled bottle. Analysis showed the solution to be 0.610 M n-butyllithium. This solution was diluted with n-pentane to a concentration of 0.244 M when used in the polymerization runs hereinafter described.

There is set forth hereinbelow a description of the procedures (designated as A, B, C, D and E) used in treating the butadiene prior to its being contacted with n-butyllithium.

A. Butadiene was passed upward through a 2" x 24" column packed with calcium hydride, through a 3" x 30" column packed with Drierite (calcium sulfate), through a Vigreux column with Dry Ice reflux to remove any dimer that was present, and then into a receiver protected with a calcium sulfate drying tube. The liquid butadiene was allowed to stand for approximately 45 minutes at −80° C. in a Dry Ice-acetone bath to freeze out any water which might still be present. It was then transferred to a bottle containing calcium sulfate, using 100 grams of calcium sulfate per 300 grams of butadiene. The bottle was swept with prepurified nitrogen prior to transfer of the butadiene.

B. Butadiene was passed through a knock out column (Vigreux column with Dry Ice reflux) to remove any dimer that was present, through ethylene glycol which had been dried by heating it to 200° C. and cooling it in an atmosphere of nitrogen, then through a 1" x 18" tube packed with glass helices to remove ethylene glycol, and then into a receiver protected with a calcium sulfate drying tube. It was transferred immediately from the receiver to a 24-ounce beverage bottle which had been swept with prepurified nitrogen.

C. Butadiene was passed through a knock out column as in B above, and then over the surface of water. The butadiene was thereafter passed as in B above through ethylene glycol, through a tube packed with glass helices to remove ethylene glycol, and finally into a receiver. It was transferred immediately from the receiver to a 24-ounce beverage bottle which has been swept with prepurified nitrogen.

D. Butadiene was passed through a knock out column as in B and then through water. Treatment of the butadiene was then continued by passing same through ethylene glycol, etc., as described in B and C hereinabove.

E. Butadiene was distilled, shaken with ethylene glycol using 10 parts by weight of the glycol per 100 parts butadiene, passed through a 1" x 18" tube packed with glass helices to remove the ethylene glycol, and then passed into a receiver protected with a calcium sulfate drying tube. It was transferred immediately from the receiver to a 24-ounce beverage bottle which had been swept with prepurified nitrogen.

Butadiene, treated according to the above-described methods, was polymerized in accordance with the following recipe:

| | Grams |
|---|---|
| Butadiene | 100 |
| Cyclohexane | 390 |
| Butyllithium (0.244 M solution) | Variable |
| Temperature, °C | 50 |
| Time, hours | 17 |

The polymerization runs were conducted in 7-ounce beverage bottles which were first charged with dry cyclohexane. Prior to charging, prepurified nitrogen was bubbled through the cyclohexane for 30 minutes at the rate of 3 liters per minute. After the diluent was charged, prepurified nitrogen was dispersed through a fritted glass tube and bubbled through it at the rate of 3 liters per minute for 5 minutes. The bottles were capped with rubber gaskets and perforated metal caps, and the monomer and n-butyllithium were introduced in that order by syringe. The bottles were then agitated in a constant temperature bath (50° C.) for 17 hours.

The polymer in each run was precipitated by the addition of isopropanol, separated, and then dried in a vacuum oven.

Five series of runs were made in which the butadiene was treated in each series by one of the treating procedures described above. The catalyst levels and results are set forth below in Table I, and the letters A, B, C, D and E are used in the table to designate the particular procedure used in treating the butadiene.

Table I

| Run No. | Butadiene Treatment | Millimols Catalyst/100 Grams Monomer | Conversion, percent | Inherent viscosity |
|---|---|---|---|---|
| 1 | A (control) | 2.0 | 0 | |
| 2 | A (control) | 2.5 | 0 | |
| 3 | A (control) | 3.0 | 100 | 2.84 |
| 4 | A (control) | 3.5 | 0 | |
| 5 | A (control) | 4.0 | essentially quantitative | |
| 6 | A (control) | 5.0 | 98 | 0.88 |
| 7 | B | 2.0 | 100 | 2.29 |
| 8 | B | 2.5 | essentially quantitative | |
| 9 | B | 3.0 | 100 | 1.07 |
| 10 | B | 3.5 | essentially quantitative | |
| 11 | B | 4.0 | ---do--- | |
| 12 | B | 5.0 | 96 | 0.67 |
| 13 | C | 2.0 | 97 | 3.02 |
| 14 | C | 2.5 | essentially quantitative | |
| 15 | C | 3.0 | 100 | 1.55 |
| 16 | C | 3.5 | essentially quantitative | |
| 17 | C | 4.0 | ---do--- | |
| 18 | C | 5.0 | 100 | 0.63 |
| 19 | D | 2.0 | 97 | 1.91 |
| 20 | D | 2.5 | essentially quantitative | |
| 21 | D | 3.0 | 100 | 1.26 |
| 22 | D | 3.5 | essentially quantitative | |
| 23 | D | 4.0 | ---do--- | |
| 24 | D | 5.0 | 100 | 0.60 |
| 25 | E | 2.0 | trace | |
| 26 | E | 2.5 | essentially quantitative | |
| 27 | E | 3.0 | 100 | 1.26 |
| 28 | E | 3.5 | essentially quantitative | |
| 29 | E | 4.0 | ---do--- | |
| 30 | E | 5.0 | 98 | 0.65 |

Polymerization was obtained in control run 3 but the product had a much higher inherent viscosity than that in runs 9, 15, 21, and 27. The catalyst level was the same in all runs. The data show that with the glycol treated butadiene, polymerization can be effected at relatively low catalyst levels to give consistently good conversions whereas with the untreated butadiene, erratic results were obtained with only one run of the first four yielding any polymer.

EXAMPLE II

Polymerization grade isoprene was distilled, and the center cut was used in a series of polymerization runs in which n-butyllithium was employed as the catalyst. A portion of the center cut from the distillation of isoprene was contacted in vapor phase with ethylene glycol which had been dried by heating to 200° C. and then cooling in an atmosphere of nitrogen. The isoprene vapor was dispersed into the glycol through a fritted glass disk. It was then passed through a tube packed with glass helices to remove the ethylene glycol, through a Vigreux column, and then into a receiver provided with a calcium sulfate drying tube. Nitrogen was passed slowly through the system to maintain a positive nitrogen pressure during this operation.

A solution of n-butyllithium in n-pentane was prepared in the manner described in Example I. The concentration of the solution employed in the polymerization of isoprene was 0.330 M.

Samples of the distilled isoprene and samples of distilled isoprene which had been treated with ethylene glycol were employed in two series of polymerization runs using 2.5, 3.0, and 3.5 millimols of n-butyllithium per 100 grams of monomer. Cyclohexane (390 grams) was employed as the diluent. Polymerization was effected in the manner described in Example I using a temperature of 50° C. and a reaction time of four hours. Polymerization occurred in all cases.

EXAMPLE II

Butadiene, treated with ethylene glycol and also without the glycol treatment, was polymerized in runs using a catalyst consisting of triisobutylaluminum and titanium tetrachloride. The runs were carried out in 7-ounce beverage bottles which had been dried in an air oven at 70° C. Toluene which had been dried by a nitrogen purge was added to the bottles. After addition to the bottles, the toluene was purged with nitrogen for an additional minute at 3 liters per minute for each 50 ml. of toluene. The catalyst was prepared by adding triisobutyl aluminum and titanium tetrachloride to toluene. Aliquots of this toluene suspension were then added to the bottles by means of a syringe. Thereafter, the butadiene was added to the bottles. In run 31, as shown in Table II, the butadiene prior to use was passed from a storage cylinder through a column to knock out dimer and then collected in a Dry Ice-cooled container. In run 32, as shown in Table II, the butadiene was passed through a tower which was filled to a depth of 8 inches with ethylene glycol and then collected in a Dry Ice-cooled container. Both samples of butadiene until used were then stored in quart bottles over Drierite (calcium sulfate) at −20° C.

The polymerization recipe used in these runs was as follows:

|  | Parts by weight |
|---|---|
| Butadiene | 100 |
| Toluene | 440 |
| Triisobutylaluminum (TBA) | Variable |
| Titanium tetrachloride (TTC) | Variable |
| Temperature, ° C | 30 |
| Time, hours | 16–17 |

The results of these runs are shown hereinbelow in Table II.

Table II

| Run No. | TBA, MHM [1] | TTC, MHM [1] | Conversion, percent |
|---|---|---|---|
| 31 [2] | 1.0 | 0.83 | 10 |
| 32 [3] | 1.0 | 0.83 | 18 |

[1] Millimoles per 100 parts of monomer.
[2] Not treated with ethylene glycol.
[3] Treated with ethylene glycol.

From a consideration of the data in Table II, it is seen that a higher conversion of the 1,3-butadiene to polymer is obtained when the monomer is treated with ethylene glycol prior to use in the polymerization. It is noted that these runs were carried out at very low catalyst levels, indicating that the treatment of the monomer with a polyhydric alcohol makes it feasible to employ lower catalyst levels in the polymerization than is possible with the untreated monomer.

EXAMPLE IV

A series of runs was carried out in which 1,3-butadiene was polymerized in the presence of a catalyst consisting of diethylzinc and molybdenum pentachloride. In runs 33 and 35, as shown in Table III, the butadiene was not treated with ethylene glycol while in runs 34 and 36 the butadiene was treated with ethylene glycol as described in Example III. Essentially the same procedure as described in Example III was followed in conducting these runs.

The polymerization recipe used in these runs was as follows:

|  | Parts by weight |
|---|---|
| Butadiene | 100 |
| Toluene | 880 |
| Diethylzinc | Variable |
| Molybdenum pentachloride | Variable |
| Temperature, ° C | 50 |
| Time, hours | 72 |

The results of these runs are shown hereinbelow in Table III.

Table III

| Run No. | Diethylzinc, MHM[1] | MoCl₅ MHM[1] | Conversion, percent |
|---|---|---|---|
| 33 [2] | 3.6 | 3.0 | 15 |
| 34 [3] | 3.6 | 3.0 | 35 |
| 35 [2] | 3.0 | 2.5 | 0 |
| 36 [3] | 3.0 | 2.5 | 15 |

[1] Millimoles per 100 parts of monomer.
[2] Not treated with ethylene glycol.
[3] Treated with ethylene glycol.

It is apparent from the data in Table III that a higher conversion is obtained when the monomer is treated with a polyhydric alcohol prior to use in the polymerization.

EXAMPLE V

A series of runs were carried out in which 1,3-butadiene was polymerized in the presence of a catalyst consisting of lithium aluminum hydride and titanium tetraiodide. In runs 37 and 39, as shown in Table IV, the butadiene was not treated with ethylene glycol while in runs 38 and 40 the butadiene was treated with ethylene glycol as described in Example III. Essentially the same procedure as described in Example III was followed in conducting these runs.

The following polymerization recipe was employed in these runs:

| | Parts by weight |
|---|---|
| Butadiene | 100 |
| Cyclohexane | 780 |
| Lithium aluminum hydride (LAH) | Variable |
| Titanium tetraiodide (TTI) | Variable |
| Mol ratio, LAH/TTI | 1.20/1 |
| Temperature, °C | 50 |
| Time, hours | 17.5 |

The results of these runs are shown hereinbelow in Table IV.

Table IV

| Run No. | LAH Parts | LAH MHM[1] | TTI Parts | TTI MHM[1] | Conversion, percent |
|---|---|---|---|---|---|
| 37 [2] | 0.570 | 1.50 | 0.695 | 1.25 | 85 |
| 38 [3] | 0.570 | 1.50 | 0.695 | 1.25 | 95 |
| 39 [2] | 0.0475 | 1.25 | 0.578 | 1.04 | 0 |
| 40 [3] | 0.0475 | 1.25 | 0.578 | 1.04 | 95 |

[1] Millimoles per 100 parts of monomer.
[2] Not treated with ethylene glycol.
[3] Treated with ethylene glycol.

EXAMPLE VI

Butadiene, treated with ethylene glycol and also without glycol treatment, was polymerized in runs using a catalyst consisting of triisobutylaluminum and titanium tetraiodide. In run 41, as shown in Table V, the butadiene was not treated with ethylene glycol while in run 42 the butadiene was treated with ethylene glycol as described in Example III. Essentially the same procedure as described in Example III was followed in conducting these runs.

The polymerization recipe used in these runs was as follows:

| | Parts by weight |
|---|---|
| Butadiene | 100 |
| Toluene | 866 |
| Triisobutylaluminum (TBA) | Variable |
| Titanium tetraiodide (TTI) | Variable |
| Mol ratio, TBA/TTI | 5.00/1 |
| Temperature, °C | 50 |
| Time, hours | 3 |

The results of these runs are shown hereinbelow in Table V.

Table V

| Run No. | TBA Parts | TBA MHM[1] | TTI Parts | TTI MHM[1] | Conversion, percent |
|---|---|---|---|---|---|
| 41 [2] | 0.397 | 2.00 | 0.222 | 0.400 | 0 |
| 42 [3] | 0.397 | 2.00 | 0.222 | 0.400 | 95 |

[1] Millimoles per 100 parts of monomer.
[2] Not treated with ethylene glycol.
[3] Treated with ethylene glycol.

From an examination of the data in Tables IV and V, it is seen that higher conversions are obtained when the monomer is treated with a polyhydric alcohol prior to the polymerization.

The rubbery polymers produced in accordance with this invention have utility in applications where natural and synthetic rubbers are used. For example, they can be used in the manufacture of automobile tires, gaskets, and other rubber articles.

As will be evident to those skilled in the art, many variations and modifications can be practiced upon consideration of the foregoing disclosure. Such variations and modifications are believed to be within the spirit and scope of the invention.

We claim:

1. In a process for preparing rubbery polymers comprising contacting a conjugated diene suitable for polymerization and containing from 4 to 10, inclusive, carbon atoms per molecule with a catalyst selected from the group consisting of (1) a compound corresponding to the formula $RLi_x$, wherein R is a hydrocarbon radical selected from the group consisting of aliphatic, cycloaliphatic and aromatic radicals and $x$ is an integer from 1 to 4, inclusive, and (2) mixtures obtained by mixing at least two essential components, one of said components being selected from the group consisting of hydrides of metals of Groups I, II and III and organo compounds of Groups I, II, III and IV-B metals and the other of said components being a metal compound selected from the group consisting of Group IV-A, Group V, Group VI and Group VIII metal compounds, said contacting occurring in the presence of a hydrocarbon diluent, the improvement which comprises mixing said conjugated diene with a polyhydric alcohol, thereby forming a conjugated diene phase and an alcohol phase, said polyhydric alcohol being liquid under the mixing conditions and being selected from the group consisting of dihydric and trihydric alcohols having from 2 to 10 carbon atoms per molecule; separating said conjugated diene phase from said alcohol phase; and contacting said catalyst with said conjugated diene phase.

2. The process according to claim 1 in which said polyhydric alcohol is a glycol.

3. The process according to claim 2 in which said glycol is ethylene glycol.

4. The process according to claim 1 in which said polyhydric alcohol is glycerol.

5. A process for preparing rubbery polymers of conjugated dienes which comprises passing a conjugated diene suitable for polymerization and containing from 4 to 10, inclusive, carbon atoms per molecule into a treating zone; mixing said conjugated diene with a substantially anhydrous polyhydric alcohol having from 2 to 10 carbon atoms per molecule in said treating zone, thereby forming a conjugated diene phase and an alcohol phase, said polyhydric alcohol being liquid under the mixing conditions and being selected from the group consisting of dihydric and trihydric alcohols; recovering said conjugated diene phase from said treating zone; contacting said conjugated diene phase with a catalyst selected from the group consisting of (1) a compound corresponding to the formula $RLi_x$, wherein R is a hydrocarbon radical selected from the group consisting of aliphatic, cycloaliphatic and aromatic radicals and $x$ is an integer from 1 to 4, inclusive, and (2) mixtures obtained by mixing at least two essential components, one of said components being selected from the group consisting of hydrides of Groups I, II and III metals and organo compounds of Groups I, II, III and IV-B metals and the other of said components being a metal compound selected from the group consisting of Group IV-A, Group V, Group VI and Group VIII metal compounds, said contacting occurring at a temperature in the range of −20 to 150° C. and in the presence of a hydrocarbon diluent, inert and liquid under conditions of the process; and recovering a rubbery polymer of said conjugated diene.

6. The process according to claim 5 in which said conjugated diene is 1,3-butadiene.

7. The process according to claim 5 in which said conjugated diene is isoprene.

8. The process according to claim 5 in which said conjugated diene is 1,3-pentadiene.

9. The process according to claim 5 in which said polyhydric alcohol is a glycol.

10. The process according to claim 9 in which said glycol is ethylene glycol.

11. The process according to claim 5 in which said catalyst consists essentially of n-butyllithium.

12. The process according to claim 5 in which said catalyst consists essentially of triisobutylaluminum and titanium tetrachloride.

13. The process according to claim 5 in which said catalyst consists essentially of diethylzinc and molybdenum pentachloride.

14. The process according to claim 5 in which said catalyst consists essentially of lithium aluminum hydride and titanium tetraiodide.

15. The process according to claim 5 in which said catalyst consists essentially of triisobutylaluminum and titanium tetraiodide.

References Cited in the file of this patent

UNITED STATES PATENTS

| | | |
|---|---|---|
| 2,552,198 | Mayland et al. | May 8, 1951 |
| 2,832,759 | Nowlin et al. | Apr. 29, 1958 |
| 2,913,444 | Diem | Nov. 17, 1959 |
| 2,925,452 | Broughton | Feb. 16, 1960 |
| 2,953,556 | Wolfe | Sept. 20, 1960 |
| 2,979,488 | Carpenter | Apr. 11, 1961 |

OTHER REFERENCES

Moor et al.: Chem. Abstracts, vol. 29, 6034 (1935).